United States Patent
Western et al.

(10) Patent No.: US 6,278,879 B1
(45) Date of Patent: Aug. 21, 2001

(54) METHOD FOR DETERMINING A TRANSMIT POWER OF A BASE STATION IN A CELLULAR COMMUNICATION SYSTEM

(75) Inventors: Gary E. Western, Wheeling; Dennis Gilliland, Bartlett; Florentino Orda, Lombard, all of IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/158,291

(22) Filed: Sep. 22, 1998

(51) Int. Cl.$^7$ ........................................ H04Q 7/22
(52) U.S. Cl. ........................ 455/436; 455/439; 370/331; 370/332
(58) Field of Search ...................... 455/423, 433, 455/436, 437, 439, 442, 443, 418, 419, 420, 13.4, 13.3, 550, 562; 370/331, 332

(56) References Cited

U.S. PATENT DOCUMENTS

| | | | |
|---|---|---|---|
| 5,465,389 | * 11/1995 | Agrawal | 455/33.2 |
| 5,659,879 | * 8/1997 | Dupuy | 455/15 |
| 5,710,974 | * 1/1998 | Granlund et al. | 455/33.2 |
| 5,784,695 | * 3/2000 | Upton et al. | 455/442 |
| 5,898,925 | * 4/1999 | Honkasalo et al. | 455/437 |
| 5,940,743 | * 8/1999 | Sunay et al. | 455/69 |
| 5,970,058 | * 10/1999 | DeClerk et al. | 370/331 |
| 6,006,093 | * 12/1999 | Aalto | 455/443 |
| 6,035,197 | * 3/2000 | Haberman | 455/439 |
| 6,038,450 | * 3/2000 | Brink et al. | 455/442 |
| 6,041,235 | * 3/2000 | Aalto | 455/437 |
| 6,044,249 | * 3/2000 | Chandra et al. | 455/62 |
| 6,088,590 | * 8/1999 | Anderson et al. | 455/437 |
| 6,167,035 | * 12/2000 | Veeravalli et al. | 370/331 |

* cited by examiner

Primary Examiner—William Trost
Assistant Examiner—Congvan Tran
(74) Attorney, Agent, or Firm—Lalita P. Williams

(57) ABSTRACT

The method includes receiving (402) at the base station a handover indication associated with a first mobile communication unit. Based on the handover indication, a desired handover power level for the first mobile communication unit is determined (404). Based on the desired handover power level, a communication link is established with the first mobile communication unit at an actual power level. A difference between the desired handover power level and the actual power level is calculated (406), and based on the difference, a transmit power of the base station is determined.

10 Claims, 1 Drawing Sheet

METHOD FOR DETERMINING A TRANSMIT POWER OF A BASE STATION IN A CELLULAR COMMUNICATION SYSTEM

FIELD OF THE INVENTION

This invention relates generally to wireless communication systems, and, more particularly, to a method for determining a transmit power of a base station in a cellular communication system.

BACKGROUND OF THE INVENTION

In a typical wireless communication system such as a cellular radio frequency (RF) radiotelephone system, a base station having a controller, a plurality of transmitters and receivers and one or more antennae, communicates with a switching center and with a mobile communication unit, or mobile station, operating within an area served by the base station.

Multiple access wireless communication between the base station and the mobile station occurs via RF channels which provide paths over which communication signals such as voice, data and video are transmitted. Base-to-mobile station communications are said to occur on a forward- or down-link channel, while mobile-to-base station communications are referred to as being on a reverse- or up-link channel. Time division multiple access (TDMA) is one example of a well-known channelization technique. A communication system using TDMA channelization is described in detail in Recommendation documents for the Global System for Mobile Communications (GSM), as well as in other standards documents such as Interim Standard (IS) 54 and IS-136, promulgated by the Telecommunications Industry Association, Washington, D.C. GSM recommendation documents, IS-54 and IS-136 describe the services and/or features of a TDMA system to users of such a system as well as performance and equipment specifications for network and portable radiotelephones operating within such a system, and are each incorporated herein by reference.

As shown in FIG. 1, external path loss 20, caused by signal fading, among other things, contributes to total path loss 16. In addition, a down-link internal path loss 10, that is, the difference between actual power radiated from base station transmitter 12 and power radiated from antenna 14, contributes to the total path loss 16 seen by mobile communication unit 18. Down-link internal path loss 10 may be caused, among other things, by normal operation RF cabling, combiners, power amplifiers and other devices, as well as by defects in such devices.

Down-link internal path loss 10 is typically measured by hardware (not shown), such as a test mobile station, located at a fixed position near base station transmitter 12. Such hardware is generally expensive to implement and maintain throughout a multi-cellular communication system having many base stations.

There is therefore a need for a method for determining a transmit power of a base station, and thus the down-link internal path loss associated with the base station, without using dedicated test hardware.

SUMMARY OF THE INVENTION

According to an aspect of the present invention, the foregoing needs are addressed by a method for determining a transmit power of a base station in a cellular communication system, the base station responsive to an antenna, which includes: at the base station, receiving a handover indication associated with a first mobile communication unit; based on the handover indication, determining a desired handover power level for the first mobile communication unit; based on the desired handover power level, establishing a communication link with the first mobile communication unit at an actual power level; calculating a difference between the desired handover power level and the actual power level; and based on the difference, determining a transmit power of the base station.

According to another aspect of the present invention, a method for determining a transmit power of a base station in a cellular communication system includes: transmitting, by a mobile communication unit to a first base station, a received signal strength associated with a second base station; in response to the received signal strength, receiving by the mobile communication unit a handover indication, the handover indication comprising a desired handover power level; based on the desired handover power level, the mobile communication unit establishing a communication link with the second base station at an actual power level; calculating a difference between the desired handover power level and the actual power level; and based on the difference, determining a transmit power of the base station.

Advantages of the present invention will become readily apparent to those skilled in the art from the following description of the preferred embodiment(s) of the invention which have been shown and described by way of illustration. As will be realized, the invention is capable of other and different embodiments, and its details are capable of modifications in various respects. Accordingly, the drawings and description are to be regarded as illustrative in nature, and not as restrictive.

DETAILED DESCRIPTION OF THE PREFERRED EMBODIMENT(S)

Figure 2:
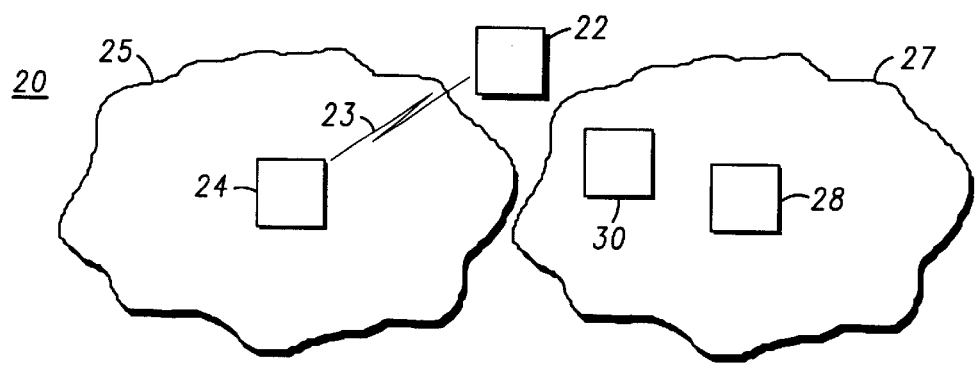
FIG. 2 illustrates use of various elements of a cellular communication system in accordance with aspects of the present invention.

Turning now to the drawings, where like numerals designate like components, FIG. 2 illustrates use of various elements of a cellular communication system 20, such as a time division multiple access (TDMA) communication system, in accordance with aspects of the present invention.

Figure 1:
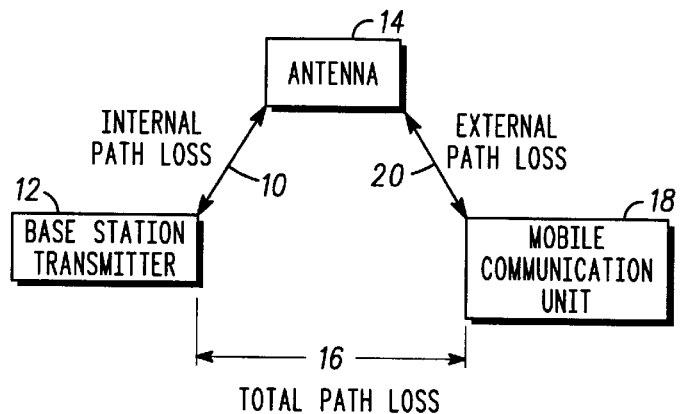
FIG. 1 is a block diagram of several elements of a typical cellular communication system, illustrating components of total path loss as seen by a mobile station.

As shown in FIG. 2, a first mobile station 22 is in communication with a serving cell 24, which may be a base station system as shown in FIG. 1 or one or more parts thereof, via a communication signal 23 on an up-link and/or down-link channel. Mobile station 22 is between geographic area 25 served by serving cell 24 and geographic area 27 served by a target cell 28, which may be a base station system as shown in FIG. 1 or one or more parts thereof. A second mobile station 30 is also shown within geographic area 27.

For purposes of discussion, it is assumed that the air-interface standard associated with system 20 supports or employs mobile-assisted handoff, which is a well-known method for transferring a communication signal associated with a mobile station from one base station to another base station based on signal strengths of the respective base stations as measured by the mobile station. For example, mobile-assisted handoff may be used to handoff mobile station 22, that is, to transfer communication signal 23 from serving cell 24 to target cell 28, when mobile station 22 moves away from serving cell 24 and toward target cell 28.

Figure 3:
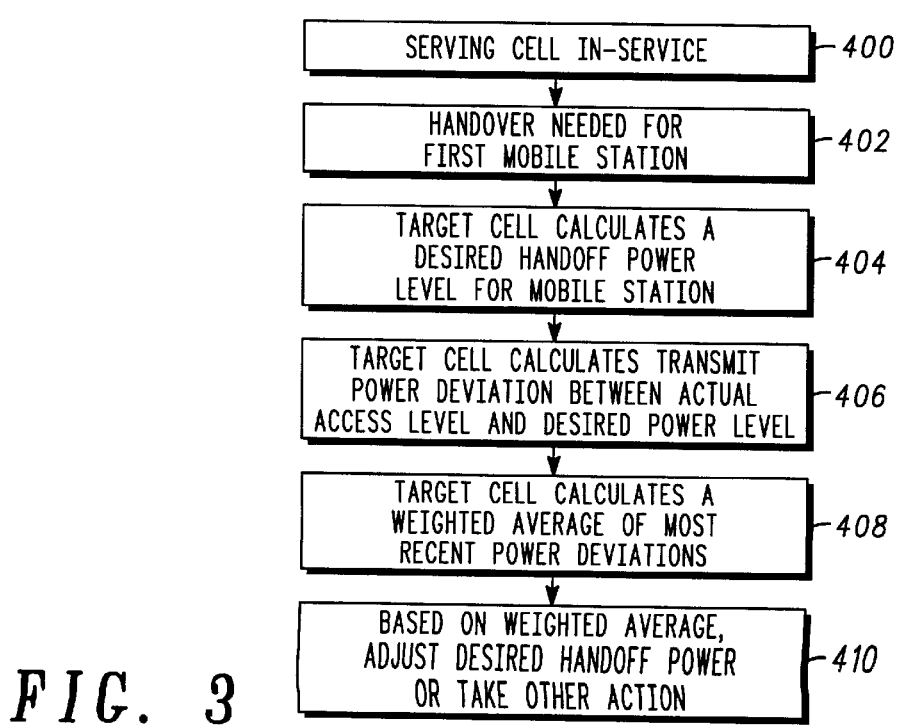
FIG. 3 is a flowchart depicting a method for determining a transmit power of a base station in a cellular communication system, according to an aspect of the present invention.

FIG. 3 is a flowchart depicting a method for determining a transmit power of a base station, such as target cell 28, in system 20 according to an aspect of the present invention. Block 400 indicates that serving cell 24 is in service and is in communication with first mobile station 22. At block 402, it is determined that handoff is needed for mobile station 22.

In accordance with a typical mobile-assisted handoff procedure, mobile station 22 measures a strength of a signal (not shown) transmitted from a cell, such as target cell 28, located near serving cell 24. The measured signal strength is transmitted by mobile station 22 to serving cell 24, which in turn transmits the measured signal strength to target cell 28 via a handover indication.

In response to the handover indication, at block 404 target cell 28 calculates a desired handoff power level. That is, based on the strength of a signal associated with target cell 28 as measured by mobile station 22, target cell 28 determines a power level at which target cell 28 would like mobile station 22 to access target cell 28. The desired handoff power level may be calculated in any suitable manner, such as by using a look-up table or database containing predetermined power values, and may be based on any number of well-known factors such as the capacity and/or loading of system 20, among other things.

The desired power level is relayed from target cell 28 to serving cell 24, and serving cell 24 instructs mobile station 22 to access target cell 28 at the desired power level.

Communication is established between target cell 28 and mobile station 22 at an actual power level. Target cell 28 calculates, at block 406, the difference between the actual power level at which mobile station 22 accessed target cell 28 and the desired power level at which mobile station 22 was instructed to access target cell 28. This difference represents the transmit power of target cell 28, and thus the internal path loss between a base station transmitter and an antenna associated with target cell 28.

As shown at block 408, target cell 28 may calculate a weighted average of the most recent power deviations, or differences, between the instructed, or desired, power level and the actual radiated power level (i.e., the internal path loss) and, as indicated at block 410, use a correction factor based on the weighted averages to adjust the desired power at which target cell 28 instructs another mobile station, such as mobile station 30, to access cell 28. In addition, the deviations or weighted averages calculated by target cell 28 may be used to generate an alarm within system 20 (at a management center, for example) or for any other purpose.

As more handoffs occur and the number of calculated power deviations increases, it would be expected that target cell 28 would arrive at a correction factor which would result in minimal error between the desired power level and the actual power level. If a change in the correction factor is noticed after an equilibrium point is reached, the detection of the change in correction factor may indicate a problem with an internal radio frequency path.

For example, if a mobile station accesses a cell at an actual power level higher than the desired power level, path 10 (shown in FIG. 1) between base station transmitter 12 and antenna 14 may have degraded. Such a situation may also be indicated if a mobile station reports to a source base station an unexpectedly low signal strengh measurement of a neighboring target base station. If, on the other hand, a mobile station accesses a cell at an actual power level lower than the desired power level, path 10 between a base station receiver (not shown in FIG. 1) and antenna 14 may have degraded.

In addition, once a correction factor has been established, if a particular mobile station accesses a particular base station with a large deviation between desired and actual power levels, the mobile station equipment may be faulty. To assist in detecting and identifying faulty mobile stations, information such as the serial number or mobile identification number of the suspect mobile station may be recorded by the base station or another network element.

It will be appreciated that at any given time target cell 28 may function as a serving cell and as a target cell, and likewise that serving cell 24 may function as a target cell 28 and as a serving cell, so that it is possible to monitor internal pathloss for any number of base stations within a multicellular communication system simultaneously, without external test equipment.

It will be understood that where an element is referred to as being responsive to another element, both such elements may be in direct or indirect communication, or may be directly or indirectly coupled to one another. In addition, one element may be directly or indirectly affected by the operations of another.

The principles of the present invention which apply to cellular-based communication systems may also apply to other types of communication systems, including but not limited to personal communication systems, trunked systems, satellite communication systems and data networks. Likewise, the principles of the present invention which apply to wireless channels such as radio frequency or microwave channels also apply to other types of communication channels such as satellite links.

It will be apparent that other and further forms of the invention may be devised without departing from the spirit and scope of the appended claims and their equivalents, and it will be understood that this invention is not to be limited in any manner to the specific embodiments described above, but will only be governed by the following claims and their equivalents.

We claim:

1. A method for determining a transmit power of a base station in a cellular communication system, the base station responsive to an antenna, the method comprising:

at the base station, receiving a handover indication associated with a first mobile communication unit;

based on the handover indication,
  determining a desired handover power level for the first mobile communication unit;
  based on the desired handover power level, establishing a communication link with the first mobile communication unit at an actual power level;

calculating a difference between the desired handover power level and the actual power level;

based on the difference, determining a transmit power of the base station; and based on the transmit power, determining a path loss from the base station to the antenna.

2. The method according to claim 1, wherein the cellular communication system comprises a time division multiple access (TDMA) communication system.

3. The method according to claim 2, wherein the step of receiving comprises receiving according to a mobile-assisted handoff procedure.

4. The method according to claim 1, wherein the desired handover power level is specified by a database.

5. A method for determining a transmit power of a base station in a cellular communication system, the base station responsive to an antenna, the method comprising:

at the base station, receiving a handover indication associated with a first mobile communication unit;

based on the handover indication,
    determining a desired handover power level for the first mobile communication unit;
    based on the desired handover power level, establishing a communication link with the first mobile communication unit at an actual power level;

calculating a difference between the desired handover power level and the actual power level;

based on the difference, determining a transmit power of the base station;

based on the transmit power, determining a path loss from the base station to the antenna; and based on the pathloss, monitoring equipment faults associated with the base station.

6. The method according to claim 5, further comprising:

based on the transmit power, determining a correction factor; and using the correction power to select the desired handover power level for a second mobile communication unit.

7. The method according to claim 6, wherein the correction factor comprises a weighted average of differences between desired handover power levels and access power levels associated with a plurality of communication units.

8. The method according to claim 5, further comprising:

based on the transmit power, notifying a management center if an alarm condition occurs.

9. A method for determining a transmit power of a base station in a cellular communication system, the base station responsive to an antenna, the method comprising:

at the base station, receiving a handover indication associated with a first mobile communication unit;

based on the handover indication,
    determining a desired handover power level for the first mobile communication unit;
    based on the desired handover power level, establishing a communication link with the first mobile communication unit at an actual power level;

calculating a difference between the desired handover power level and the actual power level;

based on the difference, determining a transmit power of the base station;

based on the transmit power, determining a path loss from the base station to the antenna; and based on the path loss, monitoring equipment faults associated with the mobile station.

10. A method for determining a transmit power of a base station in a cellular communication system, the method comprising:

transmitting, by a mobile communication unit to a first base station, a received signal strength associated with a second base station;

in response to the received signal strength, receiving by the mobile communication unit a handover indication, the handover indication comprising a desired handover power level;

based on the desired handover power level, the mobile communication unit establishing a communication link with the second base station at an actual power level;

based on a difference between the desired handover power level and the actual power level, determining a transmit power of the base station;

based on the transmit power, determining a path loss from the base station to the antenna; and based on the path loss, monitoring equipment faults associated with the base station.

* * * * *